May 12, 1959 D. W. HAWK 2,886,357
HUB LOCKING DEVICE
Filed June 5, 1957
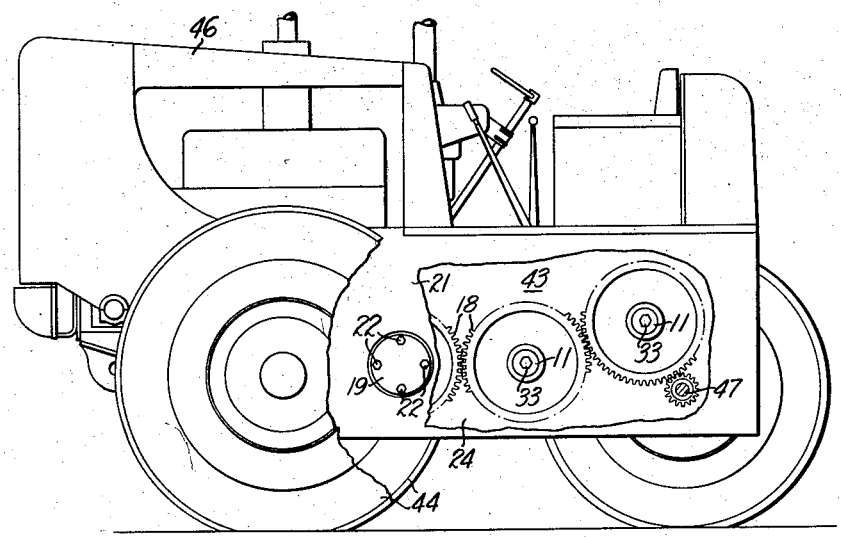
Fig. 2
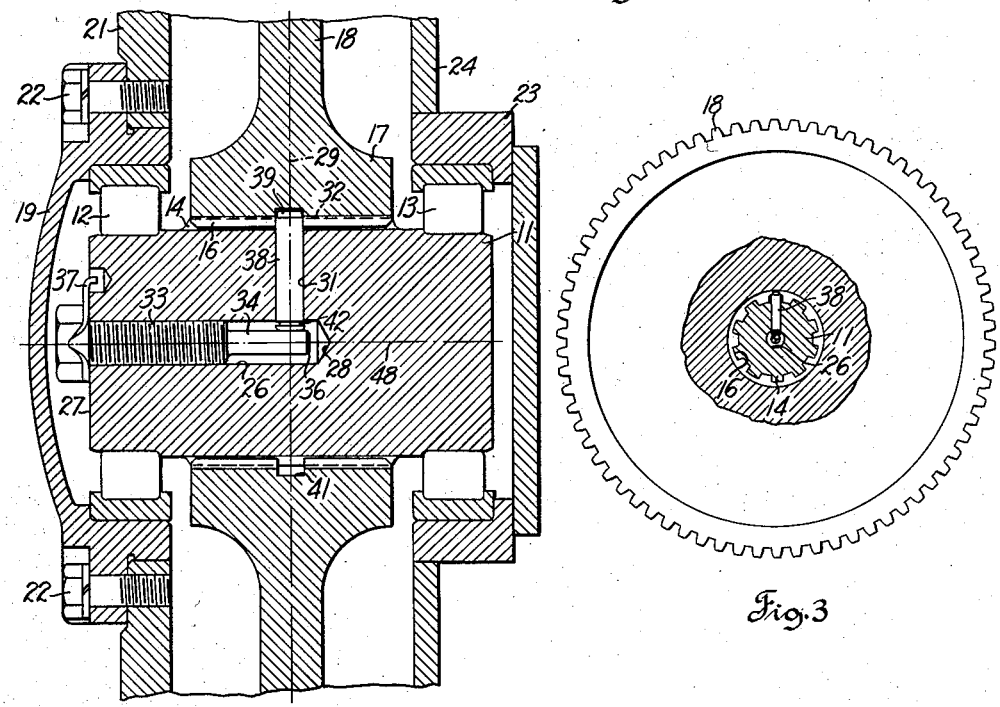
Fig. 1
Fig. 3
Inventor
Dale W. Hawk
By Charles L. Schwab
Attorney United States Patent Office 2,886,357
Patented May 12, 1959

2,886,357
HUB LOCKING DEVICE

Dale W. Hawk, Cedar Rapids, Iowa, assignor to Allis-Chalmers Manufacturing Company, Milwaukee, Wis.

Application June 5, 1957, Serial No. 663,627

1 Claim. (Cl. 287—52.08)

This invention relates to a locking device and more particularly to a locking device for preventing a hub from shifting axially on a shaft on which it is coaxially mounted.

Although the present invention is not limited thereto, it is particularly applicable to the hubs of the idler gears driven by a pinion on the rear wheel axle and transmitting the drive to the front wheels in a four wheel drive rubber tired tractor. Such idler gears generally have internally splined hub portions nonrotatably mounted on splined sections of the shafts which are supported by suitable roller bearings installed in the vertical walls forming the tractor frame and also comprising a housing for the idler gears.

It is desirable that the lateral distance between the two walls be kept to a minimum in order not to unduly increase the overall width of the tractor. Consequently, it is required that a shaft of minimum length be used and that the locking device function to positively lock the hub against axial movement without impairing the structural integrity of the shaft.

Inasmuch as the splines prevent any relative rotational movement between the shaft and the hub, it is only necessary that the locking device prevent any relative axial shifting movement between the shaft and hub. Any shifting of the hub relative to the shaft causes the idler gear to be misaligned with the other gears in the train, and material damage may result from such a misalignment if some locking means were not provided. Where the idler gear is connected to a support shaft as hereinbefore described, it is not necessary that the hub be connected to the shaft by frictional engagement since none of the driving torque is transmitted to the shaft. A frictional type of connection is not desired where an idler gear is simply supported on a splined shaft because it renders the disassembly of parts more difficult and may under some circumstances cause a distortion of the hub.

Idler gears of the type used to transmit the drive from the rear axle to the front axle in a four wheel drive tractor and housed within the tractor framework are not readily accessible. It is desirable in such installations that the supporting shaft be disassembled for inspection or repair purposes without having to remove the idler gear. In the event that heavy grease, dirt or corrosion cause parts to bind, some provisions should be made to facilitate the removal of any part that may tend to bind. In order that the parts be readily disassembled, it is desirable that none of the parts of the locking device be subjected to any distortion, burring or warping during the installation or service life of the unit and that they be accessible without the necessity of having to remove an unduly large number of parts.

It is, therefore, an object of this invention to provide a hub locking means for a rotating member that will prevent axial movement of a hub relative to a supporting shaft without requiring the forcing of any of its parts.

Another object of this invention is to provide an improved hub locking means that will permit a shaft and a hub to be readily assembled and disassembled.

It is still another object of this invention to provide a hub locking device having a minimum number of parts which are easily and economically fabricated.

A further object of this invention is to provide a hub locking device that will furnish positive locking against axial movement in a shaft of minimum length.

It is still a further object of this invention to provide a hub locking device that will prevent any axial shifting between the internally splined sections of a hub and the splined section on a shaft without any frictional connection.

A more general object of this invention is to provide an improved hub locking device incorporating the hereinbefore outlined requirements.

Other objects and advantages of this invention are made apparent in the following specification by reference to the accompanying drawings wherein:

Fig. 1 is a sectional view, partly broken away, illustrating an idler gear and shaft connection according to one embodiment of the invention;

Fig. 2 is a side view of a tractor having a portion cut away to illustrate the idler gears installed in a gear train driving the front wheels; and Fig. 3 is an enlarged view of one of the idler gears shown in Fig. 2, having the central portion cut away to illustrate the locking device.

Referring in detail to the drawings, there is shown in Fig. 1 a splined shaft 11 rotatably supported at each end by the roller bearings 12, 13. A central splined portion 14 of the shaft 11 engages an internally splined section 16 of a hub 17 of an idler gear 18. The shaft 11 and hub 17 comprise an inner and outer member, the inner coaxial member or shaft 11 being rotatably supported at the ends. The roller bearing 12 is supported in a flange cover plate 19 which is secured to a frame 21 by a plurality of cap screws 22. The other supporting bearing 13 is carried in a bearing support bracket 23 attached to an inside wall 24 which is laterally spaced from the frame 21 and forms a housing for the idler gear 18.

A portion of the shaft 11 extending from the cover plate 19 through the hub 17 is provided with a centrally disposed opening comprising a longitudinal bore 26 extending from the outer end 27 of the shaft 11 inwardly and terminating in an end wall 28 which is located beyond the central vertical axis 29 of the idler gear 18. The shaft 11 also has a transverse opening comprising a radial bore 31 extending from its outer splined surface 32 and intersecting the longitudinally extending bore 26 at the vertical midpoint of the shaft 11. The bore 26 is provided with female threads in order to receive a lock screw 33.

The lock screw 33 has an unthreaded reduced end portion 34. The end portion 34 is cylindrical in shape and has a chamfered end 36. Any accidental loosening of the lock screw 33 is insured against by the provision of a conventional lock washer 37. The lock screw 33 functions as a retaining element to maintain a key in the form of a dowel 38 in radial alignment with an annular groove 41 cut on the inside of the hub 17. The cylindrical shape of the end portion 34 makes it possible for the lock screw 33 to be rotated and moved axially while the end portion 34 is in contact with the dowel 38 without exerting any force against it. Thus, the dowel 38 is maintained in positional engagement with the annular groove 41, as distinguished from frictional engagement. This arrangement makes it virtually impossible to cause any forcing or jamming of the dowel 38 against the hub 17.

The dowel 38 is slidably disposed in the radial bore 31 of the shaft 11. At one end it is provided with a slight taper 39 where it engages the annular groove 41. The taper 39 at one end of the dowel 38 allows it to engage the groove 41 in the hub 17 even though the hub is slightly off center in relationship to the shaft 11 and serves to position the hub 17 when the dowel 38 is driven home. Near the other end of the dowel 38 an annular recess 42 is provided to make it possible for the dowel 38 to be pulled out of engagement with the groove 41 in the event that it does not slip out of the radial bore 31 by virtue of its own weight as the device is being disassembled. The annular recess 42 is located on the portion of the dowel 38 projecting into the longitudinal bore 26 so that any suitable tool can be inserted into the bore 26 to engage the annular recess 42 in order to forcibly move the key radially inward and out of its engagement with the groove 41 in the hub 17.

The splined sections 14, 16 on the hub 17 and the shaft 11 insure positive rotational movement of both members but do not prevent any relative axial movement. The tapered portion 39 of the dowel 38 projecting into the groove 41 in the hub 17 prevents any such relative axial movement which, if it occurs, may cause damage to the unit. Thus, the groove engaging portion of the dowel 38 serves as a stop to prevent any relative movement of the hub 17 in either axial direction. No frictional force is exerted by the dowel 38 on any portion of the hub 17. In view of the fact that the reduced portion 34 of the lock screw 33 is cylindrical in shape, any longitudinal movement of the lock screw 33 or any rotational movement does not affect the radial position of the dowel 38 with respect to the hub 17.

Referring to Fig. 2, the idler gear 18 is shown installed in a gear train 43 used to drive a pair of front wheels 44 of a tractor 46 from the rear wheel axle 47. The idler gears 18 are disposed on each side of the tractor 46 and enclosed in a housing formed by the side frame 21 and an inside wall 24. The cover plates 19 are accessible on the outside of the tractor 46 and can be readily removed by unscrewing the cap screws 22. The lock screw 33 can then be disengaged from the shaft 11 to allow the dowel 38 to fall into the longitudinal bore 26, rendering the locking device inoperative. The shaft 11 is now free of axial restriction and can be removed through the opening in the frame 21 provided by detaching the cover plate 19. Lateral space in the lower portion of the tractor 46 being at a premium, the shaft 11 is of minimum sufficient length to provide ample clearance between the idler gear and its containing walls 21, 24, and also to provide suitable area to mount the supporting bearings 12, 13.

It should be noted that the parts comprising this locking device require only a few relatively simple machining operations. The shaft 11 is drilled and tapered from one end along its longitudinal axis 48. At an intermediate point along its length the shaft is drilled radially until the bore 31 communicates with the longitudinal bore 26. The lock screw 33 and the dowel 38 can be inexpensively manufactured. Although an annular groove 41, as shown in Fig. 3, serves as a keyway means in the hub 17, a circular hole can be used. However, using an annular groove 41 facilitates assembly of the hub 17 on the shaft 11 because the shaft 11 does not have to be in any specific rotational position with reference to the hub 17 when it is installed.

From the foregoing description, it is apparent that the shaft 11 can be readily removed from the hub 17 without the necessity of removing the gear 18. Thus, to remove the shaft 11 from the hub 17, the cover plate 19 is first removed and then the lock screw 33 is loosened until the reduced portion 34 no longer supports the dowel 38. The dowel 38 will normally slip out of the radial bore 31 if the gear 18 is properly positioned. In the event that the dowel 38 does not freely fall out, any suitable tool may be inserted within the longitudinal bore 26 to engage the annular recess 42 and retract the dowel 38 inwardly from its engagement with the hub 17. Once the dowel 38 is fully retracted, the shaft 11 is free to be moved axially relative to the hub 17.

To install the shaft 11 in the hub 17, the dowel 38 is placed in the radial bore 31 until the end having the annular recess 42 butts against the wall of the longitudinal bore 26. When the dowel 38 is in this position, the shaft 11 can be freely inserted into the hub 17. If the dowel 38 is maintained in a "twelve o'clock" position, as viewed from the end of shaft 11, when the shaft is inserted into the splined hub 17, the dowel 38 will present no obstruction to the installation of the shaft 11. Otherwise, the dowel 38 will tend to slide radially outward and interfere with the entry of the shaft 11 into the central opening of the hub 17. When the shaft is centered axially with reference to the vertical axis 29 of the idler gear 18, rotating the radial bore 31 to a "six o'clock" position will normally cause the dowel 38 to drop into engagement with the groove 41 in the hub 17. The lock screw 33 is tightened and locked in place with the conventional lock washer 37. The cover plate 19 and bearing 12 are then installed.

By the use of two members of comparatively simple design, the lock screw 33 and the dowel 38, the applicant has provided a means for readily locking the hub 17 against relative axial movement on a shaft 11 of minimum length without having any parts that exert frictional forces against the hub 17 or shaft 11. Any possible distortion to the hub 17 due to such forces and any binding of the members that might result from any distortion, are consequently eliminated. Also, in view of the fact that the reduced portion 34 of the lock screw 33 is cylindrical in shape, carelessness on the part of personnel in the assembly or disassembly of the device cannot do damage to the gear hub 17 as may happen where a pressure type of connection is used and too much pressure is applied to the interior of a hub. Another important feature of the anchoring device is that it permits the shaft to be easily assembled and disassembled from the gear hub 17.

While only one particular embodiment of this invention has been described herein, it should be understood that the applicant's invention is not restricted thereto and that it is intended to cover all modifications of the invention which would be apparent to one skilled in the art and that come within the scope of the appended claim.

What is claimed is:

A locking device for coaxially interconnecting a hub and a shaft, said shaft having an externally splined section engaging an internally splined section within said hub, the combination comprising an annular keyway formed within said hub transversely of said splines; a longitudinal opening provided in and extending axially from the end of said shaft; a transverse opening provided in said shaft intersecting said longitudinal opening and confronting said annular keyway; a dowel slidably mounted in said transverse opening having one end extending outwardly into positional engagement with said keyway and the opposite end extending into said longitudinal bore; a retaining element mounted in said longitudinal opening for axial movement into an assembled position, said retaining element being disposed in confronting relationship with said opposite end of said dowel in said assembled position to maintain said dowel in positional engagement within said keyway; means including an annular groove on said opposite end of the dowel for forcibly retracting the latter out of positional engagement with said keyway; and means for securing said retaining element within said longitudinal opening in said assembled position.

References Cited in the file of this patent

UNITED STATES PATENTS

| 1,244,848 | Gadke | Oct. 30, 1917 |
| 1,864,466 | Peterson | June 21, 1932 |
| 2,157,676 | Rose | May 9, 1939 |
| 2,474,360 | Jimerson | June 28, 1949 |
| 2,594,402 | Crawford | Apr. 29, 1952 |